United States Patent [19]

Saitoh et al.

[11] Patent Number: 4,833,614
[45] Date of Patent: May 23, 1989

[54] AIR SUPPORT ADJUSTING APPARATUS FOR SEAT OF VEHICLE

[75] Inventors: Masatsugu Saitoh; Chikamasa Ikeda, both of Ayase, Japan

[73] Assignee: Ikeda Bussan Co., Ltd., Ayase, Japan

[21] Appl. No.: 35,421

[22] Filed: Apr. 7, 1987

[30] Foreign Application Priority Data

Apr. 8, 1986 [JP] Japan .................. 61-80499

[51] Int. Cl.$^4$ .................. B60N 1/02; G06F 15/20
[52] U.S. Cl. .................. 364/424.05; 297/284; 297/DIG. 3; 296/65.1
[58] Field of Search .................. 364/424.05, 425; 296/65 R; 297/346, 284, DIG. 3; 248/550; 307/9, 10 R, 105 B

[56] References Cited

U.S. PATENT DOCUMENTS

| | | | |
|---|---|---|---|
| 4,204,255 | 5/1980 | Cremer | 364/425 |
| 4,451,887 | 5/1984 | Harada et al. | 364/424 |
| 4,464,933 | 8/1984 | Santis | 340/712 X |
| 4,467,426 | 8/1984 | Hida et al. | 248/575 X |
| 4,477,874 | 10/1984 | Ikuta et al. | 364/424 |
| 4,516,788 | 5/1985 | Umetsu et al. | 297/284 X |
| 4,592,588 | 6/1986 | Isono et al. | 297/284 |
| 4,615,563 | 10/1986 | Kobayashi | 297/284 |
| 4,634,083 | 1/1987 | McKinnon | 297/284 X |
| 4,655,505 | 4/1987 | Kashiwamura et al. | 297/284 |
| 4,722,550 | 2/1988 | Inaoka et al. | 297/DIG. 3 X |

FOREIGN PATENT DOCUMENTS 58-69408 4/1983 Japan .................. 364/424

OTHER PUBLICATIONS

"A Liquid-Crystal Automotive Instrument Panel", by Simizu et al; Mitsubsi Denki Giho: vol. 54, No. 10, pp. 29-32, (1980).

Primary Examiner—Gary Chin
Attorney, Agent, or Firm—Foley & Lardner, Schwartz, Jeffery, Schwaab, Mack, Blumenthal & Evans

[57] ABSTRACT

An apparatus for controlling air pressure of an onboard air support system of a vehicle comprising a pump connected to the air support for supplying or discharging the air to or from the air support, a pressure sensor in association with the air support for detecting the pressure thereof, a memory for storing present pressure values for the air support, a controller for generating pump operation control data on the basis of data derived from the detection output of the pressure sensor and data of the preset pressure value stored in the memory means, and a timer for determining the period during which the pump is to be operated on the basis of control data available from the controller, and producing a control signal supplied to said pump. Upon adjustment of the air pressure of the air support, the air pressure information inputted and stored previously is compared with the current air pressure, wherein the time for which the pump is operated is set in accordance with a difference resulting from the comparison, followed by operation of the pump.

8 Claims, 8 Drawing Sheets

REESTABLISHMENT OF STORED PRESSURE

AIR SUPPORT ADJUSTING APPARATUS FOR SEAT OF VEHICLE

BACKGROUND OF THE INVENTION

1. Field of the Invention

The present invention relates to an apparatus for adjusting or regulating the air pressure within an air support embedded in the seat of a vehicle or car, and an onboard concentrated control system combined with the air support pressure adjusting apparatus.

2. Description of Prior Art

Some cars on the market at present are equipped with air supports incorporated in their seats for improving comfort, together with an associated seat controller, an air conditioner, an audio system, a video system, a telephone and other installations.

The air support, which is essentially an air bag adapted to be controlled by a seat controller, is usually incorporated in the seat cushion and the seat back for improving the comfort of the driver and passengers. More specifically, the air support is disposed at a front end portion of the seat cushion so as to adjust the pressure of the seat cushion at the location where the thigh of the driver or passenger rests and/or in the seat back at a location where the lumbar region is pressed. The air pressure can be set at a value desired by the passenger. Ordinarily, the air pressure is previously set at a desired level by the user so as to assure his or her comfortableness in driving the car.

Figure 1:
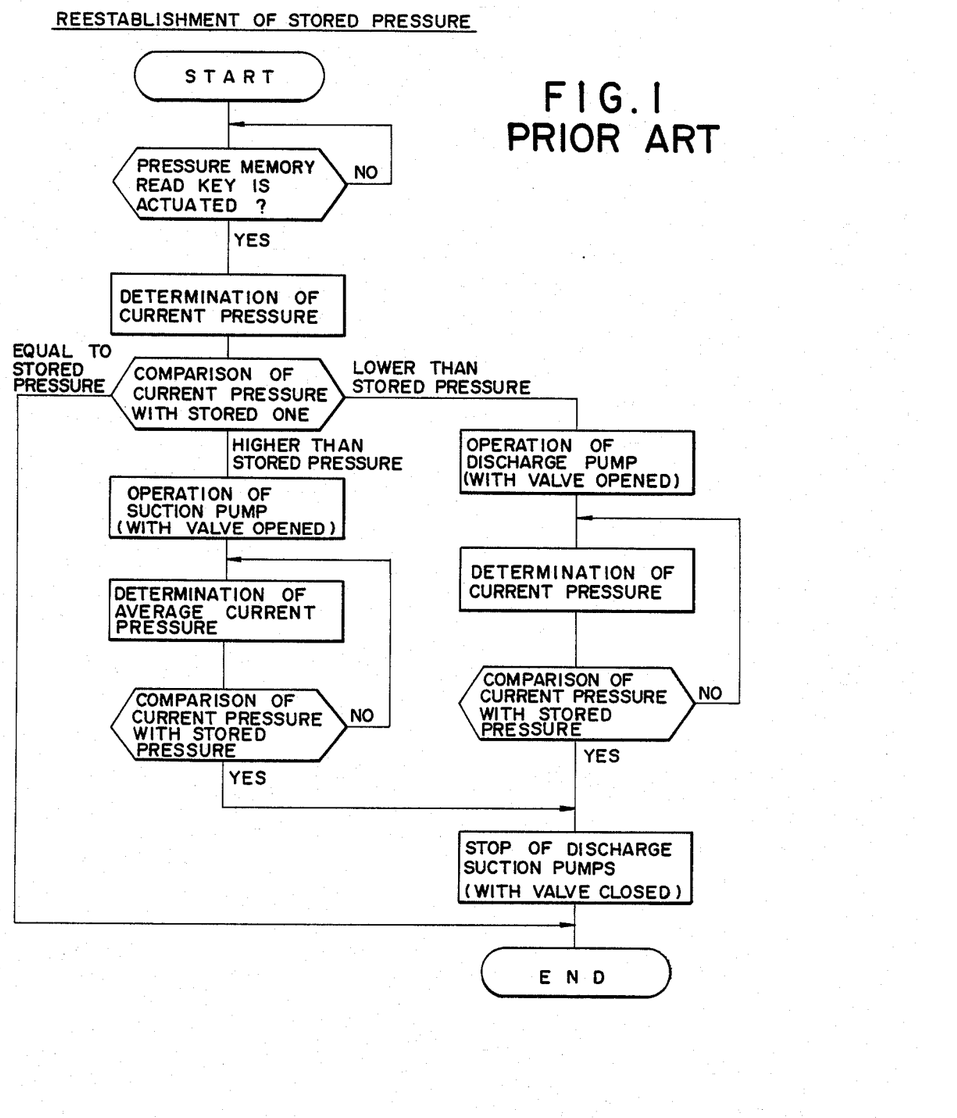
FIG. 1 is a view showing in a flow chart a hitherto known procedure for adjusting the pressure of an air support system.

Heretofore, adjustment or regulation of the air pressure within the seat air support mentioned above is performed through such a procedure as illustrated in a flow chart shown in FIG. 1.

More specifically, several levels of the air pressure to be produced within the air support are previously set on the basis of experimental data and stored in a memory. When a button switch corresponding to the pressure level desired by the user is actuated, the actual or current air pressure value within the air support is detected by appropriate means such as a pressure sensor to be subsequently compared with the corresponding value stored in the memory and selected or designated by the user. In accordance with the result of the comparison, a suction pump as well as a valve associated therewith is operated. Assuming, by way of example, that the detected pressure is higher than that stored in the memory, the air suction pump is operated to discharge the air from the air support, as the result of which the air support pressure is reduced down to a certain level. At that time, the current pressure is again measured and an averaged value thereof (since the pressure representing signal produced by a pressure sensor varies in amplitude, a mean value is determined) is compared with the selected value stored in the memory. When the current pressure is still higher than the stored value, the suction pump is again actuated to further lower the air support pressure. This procedure is repeated until the current air support pressure becomes equal to the selected value stored in the memory, indicating that the desired pressure is actually established, whereupon the suction pump is stopped. On the other hand, when the comparison results in that the stored pressure value is lower than the detected value, a charge pump is actuated to increase the air support pressure. This cycle is usually repeated several times until the desired air support pressure has been actually set at the optimum level.

The hitherto known procedure for producing the desired pressure level stored in the memory is disadvantageous in that a troublesome process is involved in controlling the suction or charge pump. The pump must be selectively actuated in accordance with the measured or detected value, not to say the difficulty encountered in accurately controlling the pumps. Further, much time is required for establishing the desired air support pressure since the pump has to be stopped with the associated valve being closed, every time the pressure measurement is performed.

Besides, control means, such as switches for various onboard equipment mentioned hereinbefore, are discretely installed at various locations such as the instrumentation panel in front of the driver and the sides of seats and the doors. Consequently, to reach the manipulation switches, the operator is necessarily forced to move his or her hand, which often requires the operator to assume unnatural posture.

SUMMARY OF THE INVENTION

It is accordingly a first object of the present invention is to provide an air support pressure adjusting apparatus which incorporates an arithmetical unit for adjusting quickly the air support pressure.

A second object of the present invention is to provide a concentrated control apparatus which makes it possible to control collectively the various onboard equipment of vehicle or car at a location which can be easily reached by the passenger of driver.

A third object of the present invention is to provide the concentrated control apparatus capable of accurately controlling a pump upon pressure adjusting of an air support.

For accomplishing the objects mentioned above, there is provided according to an aspect of the present invention an apparatus for effectively controlling air pressure of an onboard air support system of a vehicle which comprises a pump connected to the air support for supplying or discharging the air to or from the air support, a pressure sensor provided in association with the air support for detecting the pressure thereof, memory means for storing preset pressure values for the air support, a controller for generating pump operation control data on the basis of data derived from the detection output of the pressure sensor and data of the preset pressure value stored in the memory means, and a timer for determining the period during which the pump is to be operated on the basis of the control data available from the controller and producing a control signal for the pump.

According to another aspect of the present invention, there is provided an onboard concentrated control system for a car which comprises various control means such as seat operation control means, window open/close control means and the like, input/output means for outputting a predetermined signal in response to input information, controller means receiving the predetermined signal for thereby selecting the above mentioned operation control means to be activated and producing a display signal for indicating items subjected for the control together with corresponding control procedure for the selected operation control means, a display device receiving the display signal outputted by the controller means for displaying the items and the corresponding control procedure, and the aforementioned air support pressure adjusting apparatus, wherein upon adjusting the air pressure of the air support, the air pressure information registered previously is compared with the current air pressure of the air support to operate the pump correspondingly by setting the operating duration thereof in dependence on the difference between the registered pressure value and the current pressure value.

With the arrangements proposed by the present invention, the difference between the pressure value registered or stored in a memory and the current pressure value as detected can be immediately determined arithmetically, whereby the time taken for the adjustment of pressure can be significantly shortened. Further, the various equipment can be controlled from a single multi-control station without requiring troublesome procedures or any unnatural posture of the operator.

The above and other objects, advantages and features of the present invention will be better understood from the following description of the preferred embodiments thereof taken in conjunction with the accompanying drawings.

DESCRIPTION OF THE PREFERRED EMBODIMENTS

Figure 2:
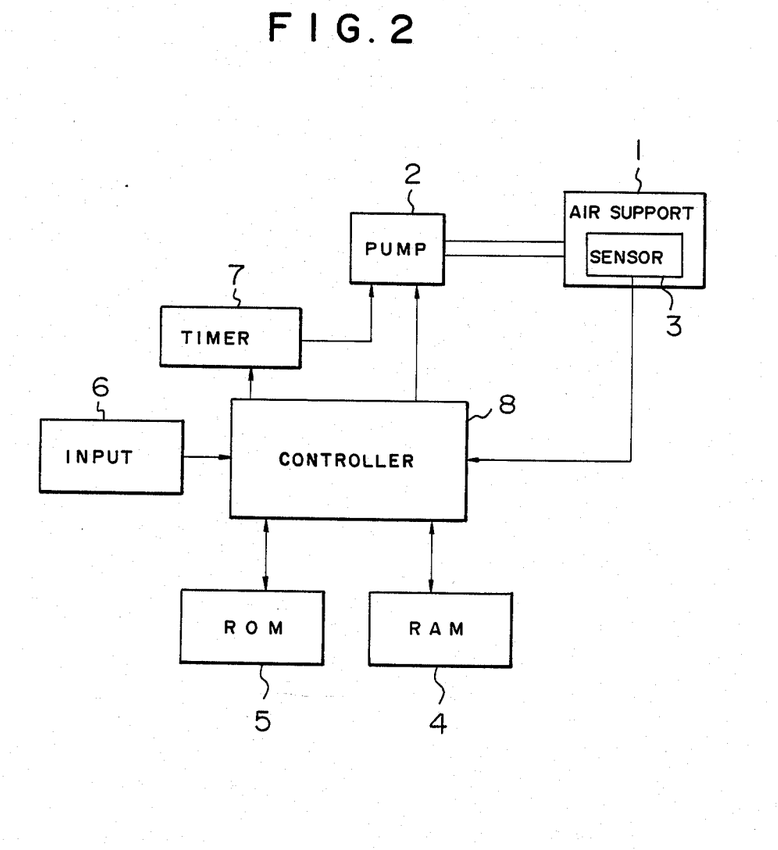
FIG. 2 is a block diagram showing a general arrangement of an air support pressure adjusting apparatus according to an exemplary embodiment of the present invention.
Figure 3:
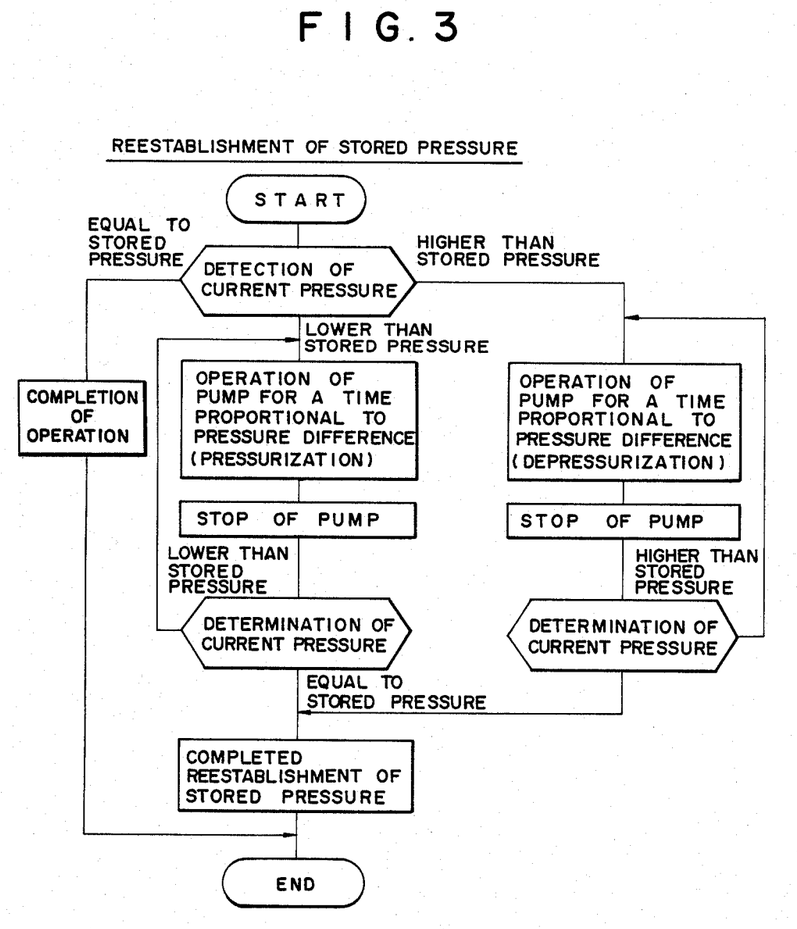
FIG. 3 is a view showing a flow chart for illustrating the operation of the air support pressure adjusting apparatus shown in FIG. 2.

FIGS. 2 and 3 are views showing, respectively, a general arrangement of the air support pressure adjusting apparatus according to an exemplary embodiment of the present invention in a block diagram, and in FIG. 3 a procedure of operation of the apparatus in a flow chart. The air support pressure adjusting apparatus according to the illustrative embodiment includes a pump 2 connected to an air support sensor 1, a pressure sensor 3 for detecting the air pressure within the air support 1, an erasable memory (hereinafter referred to as RAM) in which preset pressure value data for the air support 1 is previously stored, a read-only memory (hereinafter referred to as ROM) 5 for storing program data for operating the air pressure adjusting apparatus, an input unit 6 for writing the data into the RAM 4 and the ROM 5, a timer circuit 7 for supplying a control signal to the pump 2 and a controller 8 for controlling operations of the various components described above.

The air support 1 includes a thigh support embedded in a cushion of a seat for the vehicle and a lumbar support embedded in a seat back. The pump 2 may be constituted by a reversal pump for supplying the air to the air support 1 or discharging the air therefrom. The pressure sensor 3 detects the pressure within the air support 1, detected pressure data being supplied to the controller 1. Read-out and write-in operation to the RAM 4 and ROM 5 are performed under the control of the controller 8. The RAM 4, whose contents can be freely rewritten, is loaded with an optimum pressure set value desired by the operator through the input unit 6 which may be constituted, for example, by a keyboard, e.g. ten-key, for inputting data and operation commands. The timer 7 serves to the time or period and generates an activation signal under the command of the controller 8. After lapse of the period as set, the timer produces a control signal, i.e. a stop signal to the pump 2. It should be mentioned that a programmable ROM may be used in place of the RAM 4 and ROM 5. In that case, the storage area of the programmable ROM may be divided into a read-only zone and a rewritable zone.

The controller 8 may be constituted by a computer such as a microprocessor which incorporates a comparison unit for comparing the detected pressure data available from the pressure sensor 3 with the preset pressure value read out from the RAM 4, and an arithmetic unit to determine the operation mode (suction and discharge) of the pump 2 as well as the operating period thereof in dependence on the result of the comparison.

Next, operation of the air support pressure adjusting apparatus of the arrangement mentioned above will be described by referring to the flow chart shown in FIG. 3.

In the starting phase, an operation starting command is inputted through the input unit, whereupon the current pressure within the air support is immediately detected. Then, the controller 8 determines whether the detected pressure is equal to the preset pressure value stored in the RAM 4, or is higher or lower than the latter. When the detected air support pressure is equal to that stored in the RAM 4, this means that the air support pressure is at the level desired by the passenger. Accordingly, the seat is maintained in its existing state.

When the detected pressure value of the air support is lower than the one stored in the RAM 4, the controller 8 determines arithmetically the difference between both pressures and hence the period during which the pump 2 is to be operated. Under the control of the controller 8 and the timer 7, the pump 2 is operated during the period determined arithmetically. Upon lapse of that period, a stop signal is produced by the timer 7 to stop the pump 2. Subsequently, the air support pressure is checked for the caution's sake. If the pressure is equal to the value stored in RAM 4, this means that the desired air support pressure has been reached. The air support pressure adjusting procedure, thus, ends. If the air support pressure should be lower than the value stored in the RAM 4 after the stoppage of the pump 2, the latter is again operated so that the air support pressure assumes the value same as the one stored in the RAM 4.

On the other hand, when the detected pressure is higher than the preset value stored in the RAM 4, the difference between both pressures is also determined to cause the pump 2 to operate for a predetermined time calculated by the controller 8 to thereby lower the pressure within the air support. Upon lapse of the predetermined time, the pump 2 is stopped. For caution's sake, the pressure of the air support 1 is again checked after the stoppage of the pump 2. If the air support pressure as checked is equal to the value stored in the RAM 4, the pressure adjusting procedure comes to an end.

In this way, the pressure within the air support can be set at the optimum value.

Figure 4:
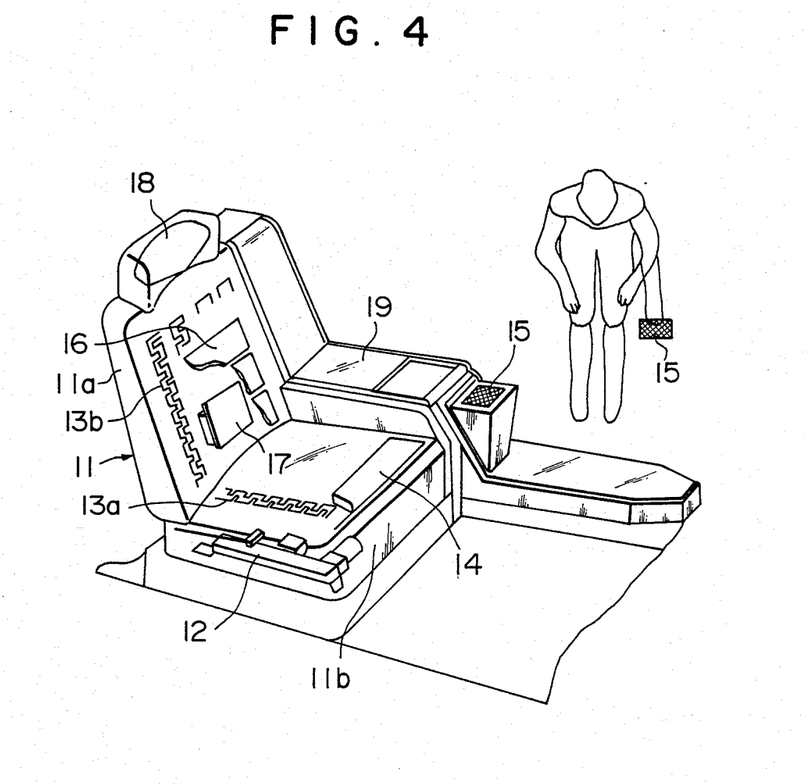
FIG. 4 is a perspective view showing, by way of example, a rear seat of a vehicle equipped with an onboard concentrated control apparatus which incorporates the air support pressure controlling function of the invention.

The air support pressure adjusting apparatus described above can be incorporated in an onboard concentrated control apparatus installed at a seat of a vehicle as shown in FIG. 4, which is a perspective view of a rear seat of the vehicle. As will be seen in FIG. 4, the rear seat 11 is composed of a seat back 11a and a seat cushion 11b. A motor-driven slide mechanism 12 is provided in association with the seat cushion to allow the rear seat to be moved as a whole. Additionally, a first seat heater 13a is provided to warm the seat. Further, a thigh support 14 for supporting the thigh of the passenger is provided for assuring the comfort of the passenger.

The seat back 11a is provided with a second seat heater 13b and a vibrator 17 for massaging the back of the passenger. Further, lumbar supports 16 each composed of three parts are provided on the left and right sides of the seat back 11a, respectively. Additionally, a head rest 18 is disposed at the top of the seat back 11a.

Disposed on the left side of the seat cushion 11b is an arm rest 19 having a front end portion where a multistation 15 including the input unit constituted by a touch panel and a display unit is disposed so as to be manipulated by the left hand of the passenger sitting on the seat.

Figure 5:
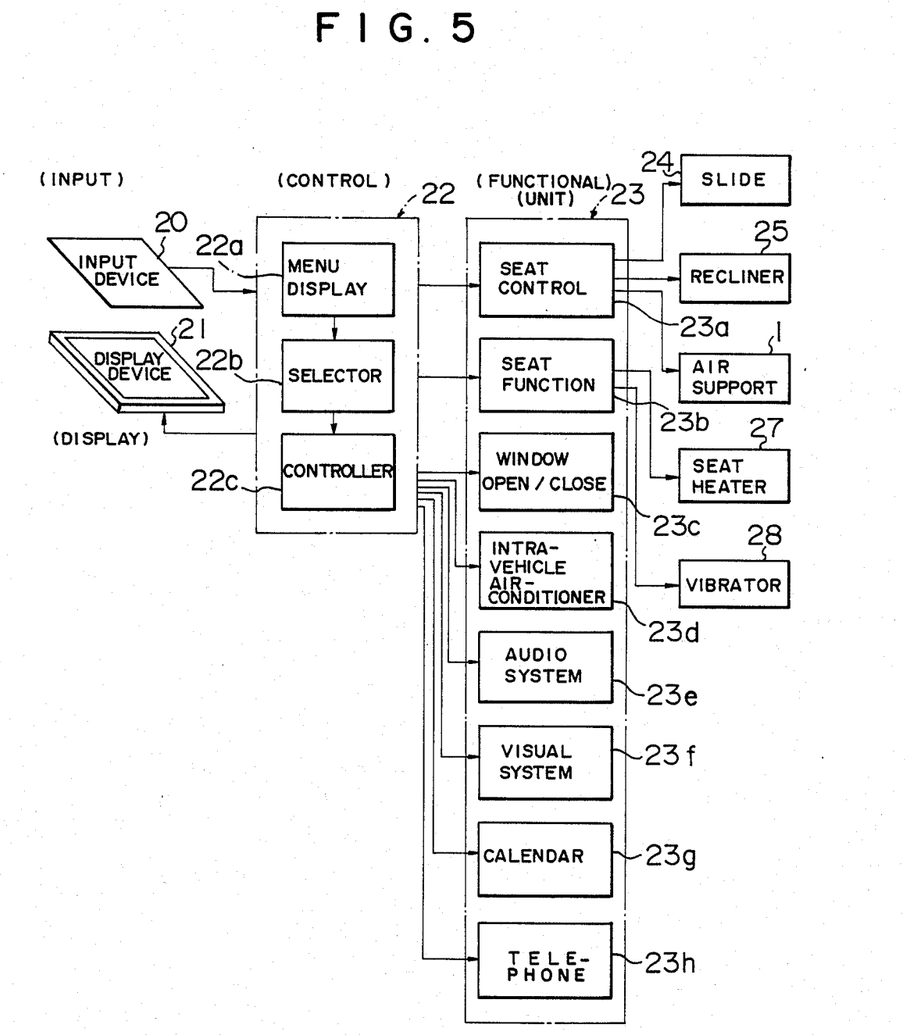
FIG. 5 is a block diagram showing a general arrangement of the onboard concentrated control apparatus.

Referring to FIG. 5, the onboard concentrated control apparatus comprises a seat control unit 23a, a seat function unit 23b, a window open/close unit 23c, an intra-vehicle air conditioner 23d, an audio system 23e, a visual system 23f, a calendar unit 23f, an input unit 20 constituted by a manually operable signal input touch panel, a controller unit 20 for receiving the signal inputted through the input unit to produce a signal indicating which of the various units 23 mentioned above is to be selected for the control, as well as a display signal indicative of the items to be controlled and the controlling precedure for the selected unit, and a liquid crystal display device 21 for displaying the items and the procedure commanded by the controller unit 20.

The seat control unit 23 is so arranged as to control the seat slide mechanism 24, a recliner 25 and the air support 1 associated with the seat under consideration, while the seat function unit 23b is adapted to control the seat heater 27 and the vibrator 28. The air support 1 constitutes the parts of the thigh support 14 and the lumbar support 16 shown in FIG. 4, while the seat heater 27 includes the first and second seat heaters 13a and 13b mentioned hereinbefore.

The control unit 22 includes a menu display 22a for displaying the items to be controlled of the various units 23 and the control procedures, a selector 22b receiving the menu signals displayed on the menu display 22a for selecting the onboard units 23 to thereby output a select signal indicative of the selected unit, a controller 22c for performing the control in response to the select signal. The controller 22c includes a memory for storing the contents of the abovementioned menu. The RAM 4, ROM 5, timer 7 and the controller 8 of the air support pressure adjusting apparatus is incorporated in the seat control unit 23a, while the input unit 6 of the air support pressure adjusting apparatus is incorporated in the input unit 20.

In the exemplary embodiment shown in FIG. 5, the input unit 20 composed of the touch panel is positioned in front of the display field of the display device 21 in an overlapping relation so that the images produced on the display device 21 can be observed through the transparent panel of the input unit 20, whereby the inputting of the control data can be accomplished by pressing or touching the displayed contents of menu (graphics, symbols and others).

Now, referring to FIGS. 6A, 6B and 7, description will be made on manipulation and operation of the onboard concentrated control apparatus of the structure mentioned above.

Figure 6A:
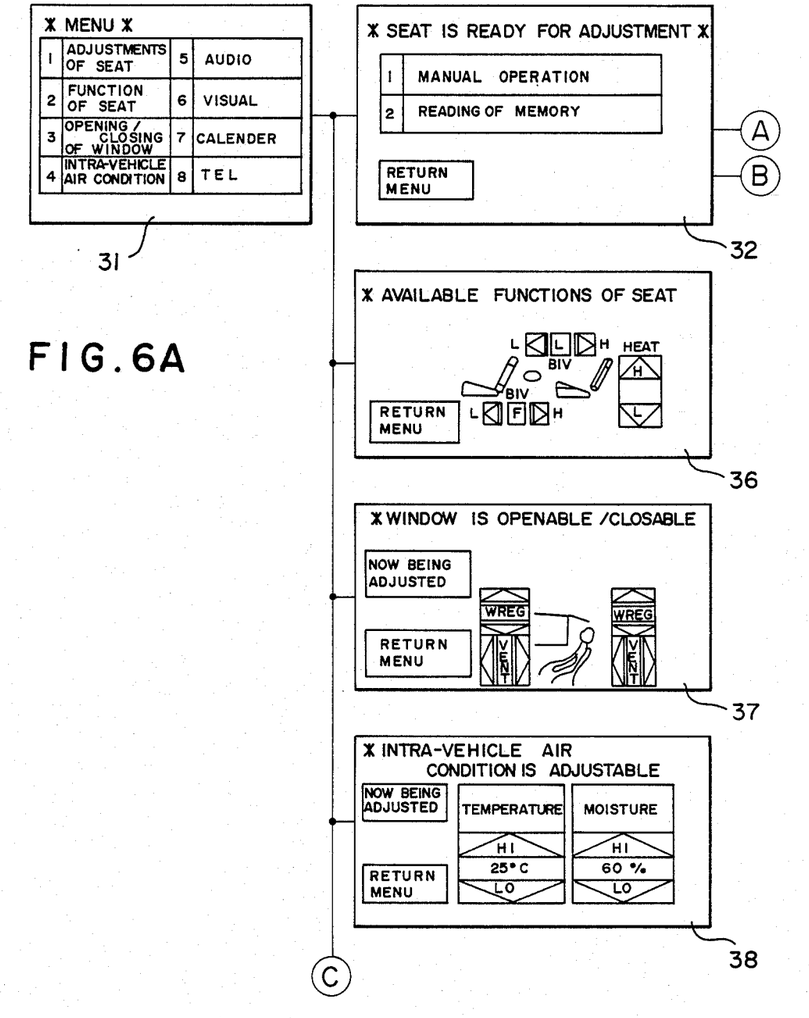
FIGS. 6A, 6B and 7 are views showing, by way of example, illustrative images displayed on a display unit which constitute a part of the onboard concentrated control apparatus.
Figure 6B:
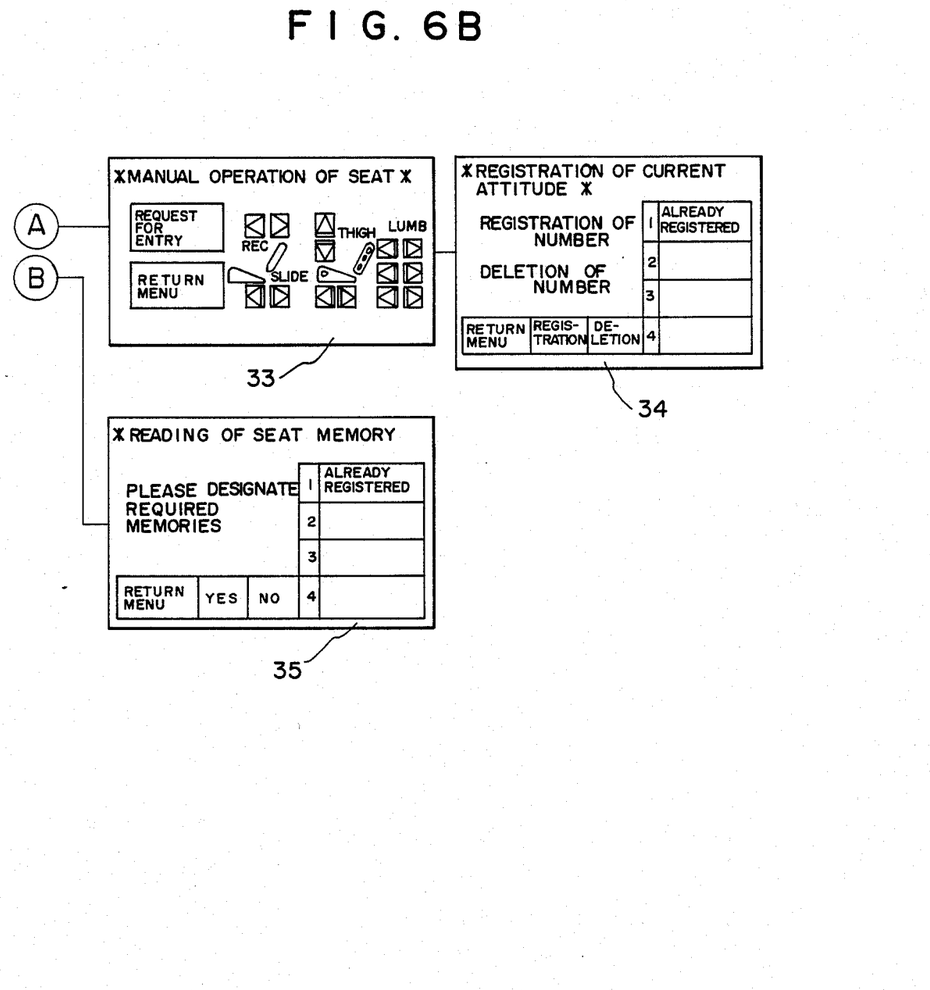

FIGS. 6A and 6B shows, by way of example only, images displayed on the display device 21. More specifically, when a power switch is closed, an image denoted generally by a reference numeral 31 is displayed in the form of menu. The displayed menu may contain, for example, "seat is ready for adjustment", "available functions of seat", "window is openable/closable" and others.

Assuming now that the passenger sitting on the seat under consideration presses the location of the menu No. 1 indicating "seat is ready for adjustment", then a display including a character string "Seat can be adjusted" is displayed together with character strings "manual operation" and "memory call". When the passenger selects "manual operation", an image denoted by a reference numeral 33 is displayed. The image or picture as displayed schematically illustrates the locations of the air support embedded in the seat. For example, the lumbar support (denoted by 16 in FIG. 4) or thigh support (denoted by 14 in FIG. 4) is displayed schematically. Additionally, the direction in which the operation is effective is displayed by a triangular mark. Assuming, by way of example, that the air pressure in an upper right portion of the lumbar support displayed with "LUMB" is to be increased, this can be accomplished by touching the triangular mark displayed at the upper right corner. Further, when the sliding mechanism is to be actuated, the lefthand mark in a displayed area "SLIDE" is pressed or touched to move the seat forwardly.

In this manner, the pressure of the lumbar support and/or the thigh support as well as the positions of the seat longitudinally of the car can be set so as to satisfy the desire of the passenger sitting on the seat in concern. When the desired pressure and/or position has been attained, the location where "registration is requested" is pressed, whereby the state of the seat in concern is maintained as it is with the state parameters being stored in the memory. Subsequently, an image denoted by a numeral 34 is displayed with the current state or attitude of the seat being registered. By way of example, if the position parameters set as mentioned above are to be registered, the menu number 1 displayed on the screen 34 may be pressed. In this manner, the air support pressure and/or other parameters can be stored in the memory.

Now, it is assumed that a passenger gets on the car under the conditions that the various seat parameters have been stored in the memory as described above.

When a main switch (not shown) is closed, then the image denoted by a reference numeral 31 in FIG. 6 is first displayed. When the passenger presses or touches the column "seat is ready for adjustment" as displayed, the image denoted by 32 makes appearance. Since the state parameters of the air support and other are stored precedingly in the memory, the passenger presses the location "memory call". Then, an image denoted by the numeral 35 makes appearance. By pressing the location of the image corresponding to a numeral "1", the seat is maintained in the state as stored in the memory.

Operation of the air support 1 in this case can be performed through the same procedure as described hereinbefore by reference to FIG. 2. Accordingly, repeated description will be unnecessary.

Figure 7:
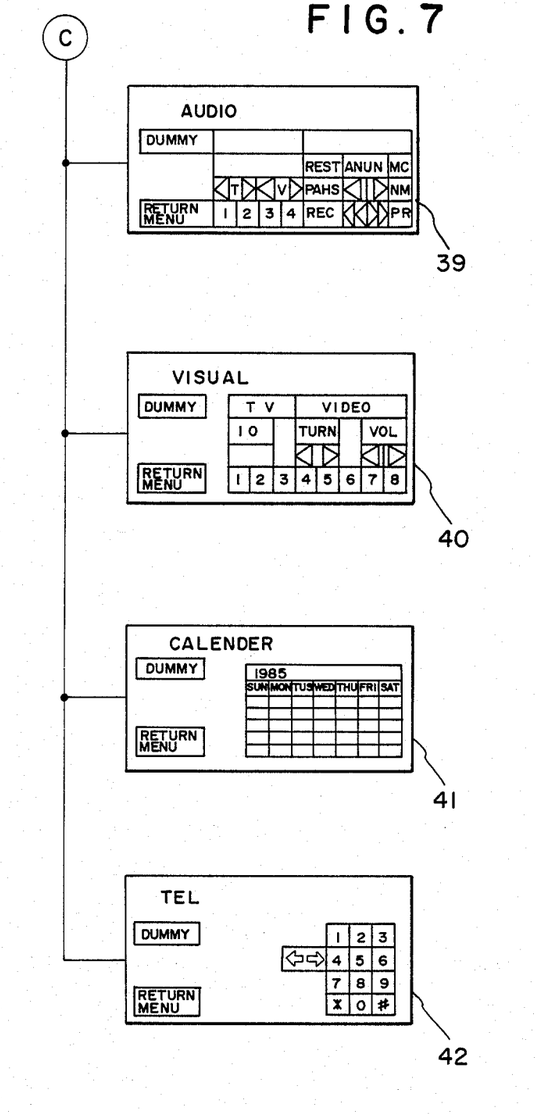

It should be added that the information displayed on the multi-station 15 (refer to FIG. 4) is not restricted to the images 31 to 35 shown in FIG. 6 but may include "seat functions are available" denoted by a numeral 36 in FIG. 6, "window is openable or closable" denoted by 37 in FIG. 6, "intra-car air conditioning is available" denoted by 38 in FIG. 6, "audio" denoted by 39 in FIG. 7, "visual" denoted by 40 in FIG. 7, "calendar" denoted by 41, "TEL" denoted by 42 and other displays. The displays of "audio" and "visual" may be processed in the similar manner to the case of the display "seat is ready for adjustment".

Although the above embodiments of the present invention has been described, it should be understood that various modifications can be made without departing from the scope and spirit of the present invention.

We claim:

1. An apparatus for controlling the air pressure of an air support, comprising:
    a pump connected to said air support for supplying or discharging the air to or from said air support;
    a pressure sensor for detecting the air pressure within said air support;
    a memory means for storing a preset pressure value for said air support;
    a controller for generating pump operation control data by calculating the time for which the pump is to be operated on the basis of data derived from the detected output of said pressure sensor and data derived from the preset pressure value stored in said memory means; and
    a timer for counting the time during which said pump is to be operated on the basis of the control data available from said controller and providing a control signal to said pump indicative of said time.

2. An apparatus according to claim 1, wherein said air support forms part of a lumbar support on a vehicle seat.

3. An apparatus according to claim 1, wherein said air support forms part of a thigh support provided on a vehicle seat cushion.

4. An apparatus according to claim 1, further indicating data input means connected to said memory means which allows the preset pressure value to be rewritten as a user wishes.

5. An apparatus according to claim 1, wherein, after the operation of said pump, the pressure data of said air support is again detected for comparison with the preset pressure data stored in said memory means.

6. In combination with a centrally located control system for a vehicle, comprising: operation control means, such as a seat operation control means and a window open/close control means; input/output means for outputting a predetermined signal in response to input information; a controller means receiving a predetermined signal for selecting said operation control means for actuation and producing a display signal for indicating items for control together with corresponding control procedures for said selected operation control means; and a display device for receiving said display signal outputted by said controller means for displaying said items and said corresponding procedures;
    an air support pressure control apparatus for said seat operation control means, comprising: a memory means in which a preset air pressure value for an air support is stored, a controller; a timer; a pump connected to said air support for supplying or discharging the air to or from said air support; a pressure sensor for detecting the air pressure within said air support; wherein said controller generates pump operation control data by calculating the time for which the pump is to be operated on the basis of the detection data of said pressure sensor and the preset pressure data stored in said memory means, while said timer counts the time for which said pump is operated on the basis of control data supplied from said controller and thereby provides a control signal to said pump.

7. A method for operating an air filled support device comprising the steps of:
    storing in a memory a preset air pressure value for the air pressure within the support device;
    detecting the actual air pressure within the air support device;
    comparing the detected air pressure to the preset air pressure value stored in the memory means; and
    on the basis of this comparison, generating a timing signal indicative of the period for which an air pump is to be operated to reach a predetermined air pressure; and
    providing said generated timing signal to a pump, whereby air is either added to the air support device or removed therefrom.

8. The method of claim 7 further including the step of varying the preset pressure value.

* * * * *